May 23, 1950            R. F. CORBETT            2,509,035
PIE
Filed Nov. 1, 1947
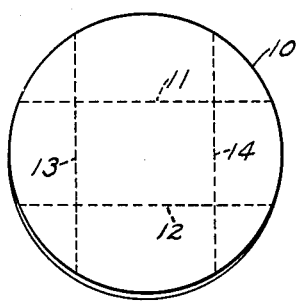
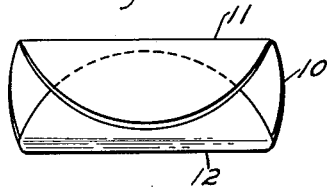
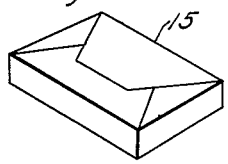
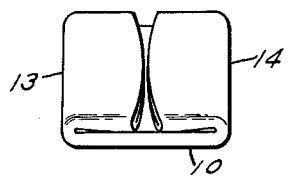
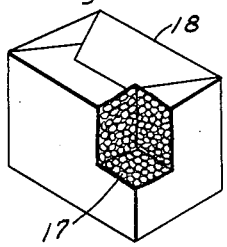
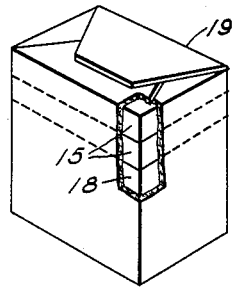
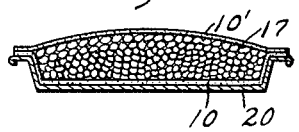
WITNESSES:
Leon M. Garman
INVENTOR
Ray F. Corbett.
BY
F. E. Browder
ATTORNEY Patented May 23, 1950

2,509,035

UNITED STATES PATENT OFFICE 2,509,035

PIE

Ray F. Corbett, Lewisburg, Pa.

Application November 1, 1947, Serial No. 783,541

3 Claims. (Cl. 99—92)

This invention relates to the process of producing and merchandising pies, and more particularly the process of producing and merchandising frozen pies.

In the art of commercially producing frozen pies, the prior art of which I am aware is exemplified by United States Patent 2,248,289, Martha Thal. Thal discloses a process which comprises using a frozen pie filler, which has been kept in cold storage, thawing the filler, applying a crust to the filler, quick freezing the unbaked assembled pie, and placing the completely assembled unbaked pie in cold storage for future use. This process is subject to objections in that the many steps are time consuming and expensive. The assembled pie requires a large amount of space for storage, and it must be merchandised or sold in completely assembled state which means that it must be sold in a plate or protective carton. It has also been found that when pies are merchandised or sold completely assembled in the form for baking, the percentage of unsalable pies is high due to damage caused by handling.

I overcome the objections to the prior art process by providing a process of producing pies which comprises preparing a crust to the desired size and shape, preparing a filler, quick freezing both the crust and filler and packaging the crust and filler for cold storage and sale to the consumer. My package is of such size and shape that it will occupy a minimum of cold storage space, and it may be safely carried in a shopping bag, or the like, along with other packages without danger of damaging the pie.

When the consumer desires to use the pie, he will thaw out the crust and filler and assemble the pie in the shape desired for use. The pie is then baked in a suitable oven. My process gives the consumer the satisfaction of assembling the pie in the desired form and also the satisfaction of seeing what ingredients go into the pie.

It is an object to provide an improved process of producing pies.

It is another object to provide an improved process of producing frozen pies.

It is still another object to provide an improved process of merchandising frozen pies.

It is still another object to provide commercially unbaked or raw frozen pies which may be thawed out, assembled and baked by the consumer.

It is still another object to provide an improved process of producing and merchandising frozen pies which eliminate the objections to the prior art process.

These and other objects are effected by this invention, as will be apparent from the following description and claims, taken in connection with the accompanying drawings forming a part of this application, in which:

Figure 1 is a plan view of a pie crust prepared in accordance with my invention;

Fig. 2 shows the crust of Fig. 1 folded once in preparing it for packaging;

Fig. 3 shows the crust of Fig. 1 folded a second time in preparing it for packaging;

Fig. 4 shows the crust of Fig. 1 packaged;

Fig. 5 shows the pie filler packaged;

Fig. 6 shows the crust and the filler both packaged in a single package for sale; and Fig. 7 shows the completely assembled pie ready for baking.

Referring to the drawings in detail, Fig. 1 illustrates a pie crust 10 which has been rolled out to the desired size, shape and thickness for a pie. The crust 10 is formed from dough prepared according to a desired recipe. The crust 10 is folded along line 11 and 12, as shown by Fig. 2, then it is folded again from the opposite directions, as indicated at 13 and 14 in Fig. 3. After the crust 10 has been folded, as shown in Fig. 3, it is placed in an envelope or package 15, Fig. 4, and the package is sealed. The package 15 may be made of any satisfactory material, such as some of the commercially available transparent wrapping papers, or wax paper. The package 15 is of such character as to exclude air and moisture from the crust 10.

In Fig. 5 is illustrated a preferred arrangement for packaging a pie filler 17. The desired quantity of filler 17 required to make a pie is measured and placed in an envelope or package 18, and the package is sealed. The package 18 may be made of the same kind of material as the package 15, and it is of such character as to exclude moisture and air from the filler 17. The filler 17 may be any desired material, such as cherries, berries, apples, peaches, apricots, rhubarb, pumpkin and the like.

The crust and the filler are next packaged in a single package 19, Fig. 6, for storing and merchandising. The filler package 18 is first placed in the package 19, and the desired number of crust packages 15 are then placed on top thereof. The package 19 is then sealed and the contents thereof subjected to quick freezing at some temperature that is low enough to freeze the crust 10 and the filler 17 for commercial preserving and merchandising. The package 19 is then kept in cold storage until sold to a customer. It is understood that, if desired, the crust 10 and the filler 17 may be frozen in their individual packages before they are placed in the package 19.

Although Fig. 6 shows two crust packaged with one filler, it is understood that any desired number of crust packages may be packaged with each filler package.

The package 19 may be made of any suitable material, such as paper, or cardboard, and it is preferably made square, rectangular, or some other suitable shape so that it may be conveniently stored in the refrigerators available in stores and homes along with other commercial packages without causing loss of space, such as is incurred when odd shaped packages are stored.

The pie package 19 may be stored in any household refrigerator until such time as it is desired to bake the pie. To prepare the pie for baking, the package 19 is opened and the crust packages 15 and the filler package 18 are removed. The crust 10 is thawed, then it is carefully unfolded and any creases left by the folds are smoothed down with a table fork. The bottom crust 10 is then placed in a pie pan 20. The filler 17 is then thawed and placed in the bottom crust 10. A second crust 10' is then placed on top of the filler 17 and sealed to the bottom crust 10 along the edge of the pan 20. The two crust are then trimmed along the rim of the pan 20, and the pie is then placed in a suitable oven and baked.

The crust 10 and the filler 17 may be thawed while still in their respective packages 15 and 18 or, if desired, the packages may be removed before they are thawed.

An advantage of my process is that a consumer may purchase a number of frozen pies at one time and conveniently store them in a household refrigerator until it is desired to use them.

From the foregoing description, taken in connection with the accompanying drawings, it is seen that I have provided an improved process for providing frozen pie crust and fillers so that they may be conveniently and economically sold to a customer who may easily fabricate the crust and filler into a pie at such time as is desired.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth by the appended claims.

I claim as my invention:

1. The method of producing pies, including the steps of preparing crust dough, forming a crust in the desired shape and thickness from said dough, folding said crust to a size convenient for packaging, preparing a filler, freezing said unbaked crust and filler, storing said crust and filler in said frozen condition in a unitary package, and thawing said crust and filler and combining the two to form a pie when it is desired to use said pie.

2. The method of providing pies, including the steps of preparing a crust in the shape desired for the pie, folding said crust to a shape convenient for packaging, packaging said crust, preparing a filler, packaging said filler in a package separate from said crust, packaging said crust package and said filler package in another package convenient for merchandising, and freezing said crust and filler.

3. The method of providing pies, including the steps of preparing a crust to the desired size, folding said crust to a smaller size convenient for packaging, packaging said crust, freezing said crust, preparing a filler, packaging said filler, freezing said filler, storing said crust and filler in cold storage until it is desired to use the pie, thawing said crust, unfolding said crust, thawing said filler, and combining said crust and said filler to provide a pie.

RAY F. CORBETT.

REFERENCES CITED

The following references are of record in the file of this patent:

UNITED STATES PATENTS

| Number | Name | Date |
|---|---|---|
| 2,248,289 | Thal | July 8, 1941 |
| 2,305,712 | Kaefer | Dec. 22, 1942 |

OTHER REFERENCES

"The Freezing Preservation of Foods", Tressler and Evers, The Avi Publishing Co., Inc., New York, 1943, page 630.